United States Patent
Nagai

(10) Patent No.: US 9,514,449 B2
(45) Date of Patent: Dec. 6, 2016

(54) ADVERTISEMENT WEBSITE CONNECTING PROGRAM, MEMORY MEDIUM, INFORMATION PROCESSING DEVICE, AND SERVER DEVICE

(75) Inventor: Hiroaki Nagai, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1185 days.

(21) Appl. No.: 12/531,109

(22) PCT Filed: Mar. 3, 2008

(86) PCT No.: PCT/JP2008/053759
§ 371 (c)(1),
(2), (4) Date: Sep. 14, 2009

(87) PCT Pub. No.: WO2008/111415
PCT Pub. Date: Sep. 18, 2008

(65) Prior Publication Data
US 2010/0088184 A1    Apr. 8, 2010

(30) Foreign Application Priority Data

Mar. 14, 2007  (JP) ................................ 2007-064738

(51) Int. Cl.
*G06Q 30/00* (2012.01)
*G06Q 20/06* (2012.01)
(Continued)

(52) U.S. Cl.
CPC .......... *G06Q 20/065* (2013.01); *G06Q 20/322* (2013.01); *G06Q 20/327* (2013.01); *G06Q 30/02* (2013.01); *G06Q 30/0273* (2013.01)

(58) Field of Classification Search
CPC ................................................ G06Q 30/0214
USPC .......................................................... 705/14
See application file for complete search history.

(56) References Cited

U.S. PATENT DOCUMENTS 6,450,407 B1 *  9/2002  Freeman et al. .............. 235/492
7,699,233 B2 *  4/2010  Pesonen ........................ 235/492
(Continued)

FOREIGN PATENT DOCUMENTS

JP    2000322383    11/2000
JP    2002109398     4/2002
(Continued)

OTHER PUBLICATIONS

Supplementary European Search Report issued Feb. 15, 2011, for corresponding European Appln. No. 08721179.3.

*Primary Examiner* — Matthew L Hamilton
(74) *Attorney, Agent, or Firm* — Chip Law Group

(57) ABSTRACT

When an electronic money card is set to a reader/writer, an introducing site connection unit is activated to connect a user terminal to an introducing site. The introducing site connection unit stores manufacturer information and transmits an electronic money function unit ID and the manufacturer information read from the electronic money card to the introducing site. An introducing server connects the user terminal to an affiliated store server through the introducing site, and the affiliated store server transmits purchase information to the introducing server when a user purchases. The introducing server calculates a commission amount from the purchase information and transmits the calculated amount together with the electronic money function unit ID and the manufacturer information to a distributing server. The distributing server distributes the commission amount to the electronic money function unit ID and the manufacturer information based on a predetermined distribution ratio.

10 Claims, 12 Drawing Sheets

(51) Int. Cl.
*G06Q 20/32* (2012.01)
*G06Q 30/02* (2012.01)

(56) References Cited

U.S. PATENT DOCUMENTS

2001/0037205 A1* 11/2001 Joao ................................. 705/1
2004/0044618 A1 3/2004 Tanaka et al.
2005/0010787 A1* 1/2005 Tarbouriech .................. 713/185
2013/0166413 A1* 6/2013 Greaves et al. ........... 705/26.44

FOREIGN PATENT DOCUMENTS

| JP | 2004326727 | 11/2004 |
| JP | 2005326983 | 11/2005 |
| JP | 2006190099 | 7/2006 |
| WO | 01/80049 A1 | 10/2001 |

* cited by examiner

Fig.8

INTRODUCTORY HISTORY DATABASE

| INTRODUC-TORY ID | INTRODUC-TORY DATE AND HOUR | ELECTRONIC MONEY FUNCTION UNIT ID | MANUFAC-TURER INFORMATION | AFFILIATED STORE ID | COMMISSION AMOUNT | ... |
|---|---|---|---|---|---|---|
| AF568 | 2007.3.2 | 123456 | MK0301 | SP524 | 5000 | ... |
| ... | ... | ... | ... | ... | ... | ... |

Fig.9

(a) DISTRIBUTION TABLE

| USER | 50% |
|---|---|
| MANUFAC-TURER | 50% |

(b) USER COMMISSION AMOUNT DATA

| ELECTRONIC MONEY FUNCTION UNIT ID | MONEY AMOUNT |
|---|---|
| 1 2 3 4 5 6 | 100 YEN |
| ... | ... |

(c) MANUFACTURER COMMISSION AMOUNT DATA

| MANUFACTURER | MONEY AMOUNT |
|---|---|
| COMPANY A | 1,500,000 YEN |
| ... | ... |

ADVERTISEMENT WEBSITE CONNECTING PROGRAM, MEMORY MEDIUM, INFORMATION PROCESSING DEVICE, AND SERVER DEVICE

CROSS REFERENCE TO RELATED APPLICATIONS

The present application is a national stage of International Application No. PCT/JP2008/053759 filed on Mar. 3, 2008 and claims priority to Japanese Patent Application No. 2007-064738 filed on Mar. 14, 2007, the disclosures of which are incorporated herein by reference.

TECHNICAL FIELD

The present invention relates to an advertisement website connecting program, a memory medium, an information processing device, and a server device, and it relates to, e.g., those that lead a user of an IC card to an advertisement website.

BACKGROUND ART

With recent spread of the Internet, an advertising technique called "affiliate" has been actively utilized.

The affiliate is a scheme that an administrator of a website provides a link to a website of a predetermined store by, e.g., banner advertisement and the administrator of the website receives a payment from the store when a viewer of the website does his/her shopping at the website of the store through this link.

As a technology concerning the affiliate, there is the following "advertisement distribution system", for example.
Patent Citation 1: Japanese Patent Application Laid-open No. 2003-208538

According to this technology, the cumulative visit number of customers who have accessed a commercial site through an affiliate site is calculated, and a commission is calculated based on a ranking obtained from this calculation.

DISCLOSURE OF INVENTION

Technical Problem

However, in a conventional example, a commission is returned to an administrator of an affiliate site alone, and a commission is not paid to, e.g., a manufacturer of a computer that is used as a user terminal or an affiliate program that supports connection to the affiliate site even though they contribute to an effect of bringing in customers.

It is, therefore, an object of the present invention to widely return a commission to related parties contributing to the effect of bringing in customers.

Technical Solution

To achieve this object, according to the present invention, the invention according to claim 1 provides an advertisement website connecting program that realizes a function of connecting a customer terminal to an advertisement website that leads to a business transaction website of a store, the customer terminal being a computer including a reader/writer that accesses an IC chip of a customer, the program using the computer to realize: a detecting function of detecting that the IC chip is connected with the reader/writer; a connecting function of connecting the customer terminal to a predetermined advertisement website when the connection is detected; a commission object person information storing function of storing commission object person information that specifies a commission object person who receives a commission based on past results of leading the customer to the business transaction website through the predetermined advertisement website; and a commission object person information transmitting function of transmitting the stored commission object person information to the connected advertisement website.

The invention according to claim 2 provides the advertisement website connecting program defined in claim 1, wherein the commission object person information is included in connection information when connecting to the predetermined advertisement website by the connecting function.

The invention according to claim 3 provides the advertisement website connecting program defined in claim 1 or 2, wherein an IC chip information transmitting function of acquiring IC chip information that specifies the IC chip from the IC chip that has detected the connection and transmitting the acquired information to the connected advertisement website is realized.

The invention according to claim 4 provides the advertisement website connecting program defined in claim 1, 2, or 3, wherein a predetermined program is installed in the IC chip, and the detecting function detects the IC chip having the predetermined program installed therein.

The invention according to claim 5 provides the advertisement website connecting program defined in any one of claims 1 to 4, wherein the predetermined program is an electronic money processing program that realizes a function of storing a monetary value and a function of increasing/decreasing the stored monetary value in the IC chip, and the electronic money processing program enables performing account settlement in the business transaction website.

The invention according to claim 6 provides a memory medium that stores the advertisement website connecting program defined in any one of claims 1 to 5 so as to be readable by a computer.

The invention according to claim 7 provides an information processing device comprising: storing means for storing the advertisement website connecting program defined in any one of claims 1 to 5; executing means for executing the stored advertisement website connecting program; and a reader/writer that accesses an IC chip.

The invention according to claim 8 provides a server device that accepts access from a customer terminal and operates an advertisement website that leads to a business transaction website of a store, comprising: connection accepting means for accepting connection to the advertisement website from the customer terminal; leading means for leading a customer to the business transaction website by connecting the customer terminal that has accepted the connection to the business transaction website; commission object person information acquiring means for acquiring from the customer terminal commission object person information that specifies a commission object person who receives a commission based on past results of the lead; commission amount acquiring means for acquiring a commission amount based on the past results of the lead; and storing means for storing the acquired commission object person information and the commission amount in association with each other.

Advantageous Effects

According to the present invention, information that specifies a commission object person is stored in the user terminal, and a profit is also returned to this commission object person, thereby distributing the commission.

BRIEF DESCRIPTION OF THE DRAWINGS

FIG. 8 is a view showing an example of a logical configuration of an introduction history database;

FIG. 9 is a view for explaining a database and others that a distributing server has;

EXPLANATION OF REFERENCE

Figure 1:
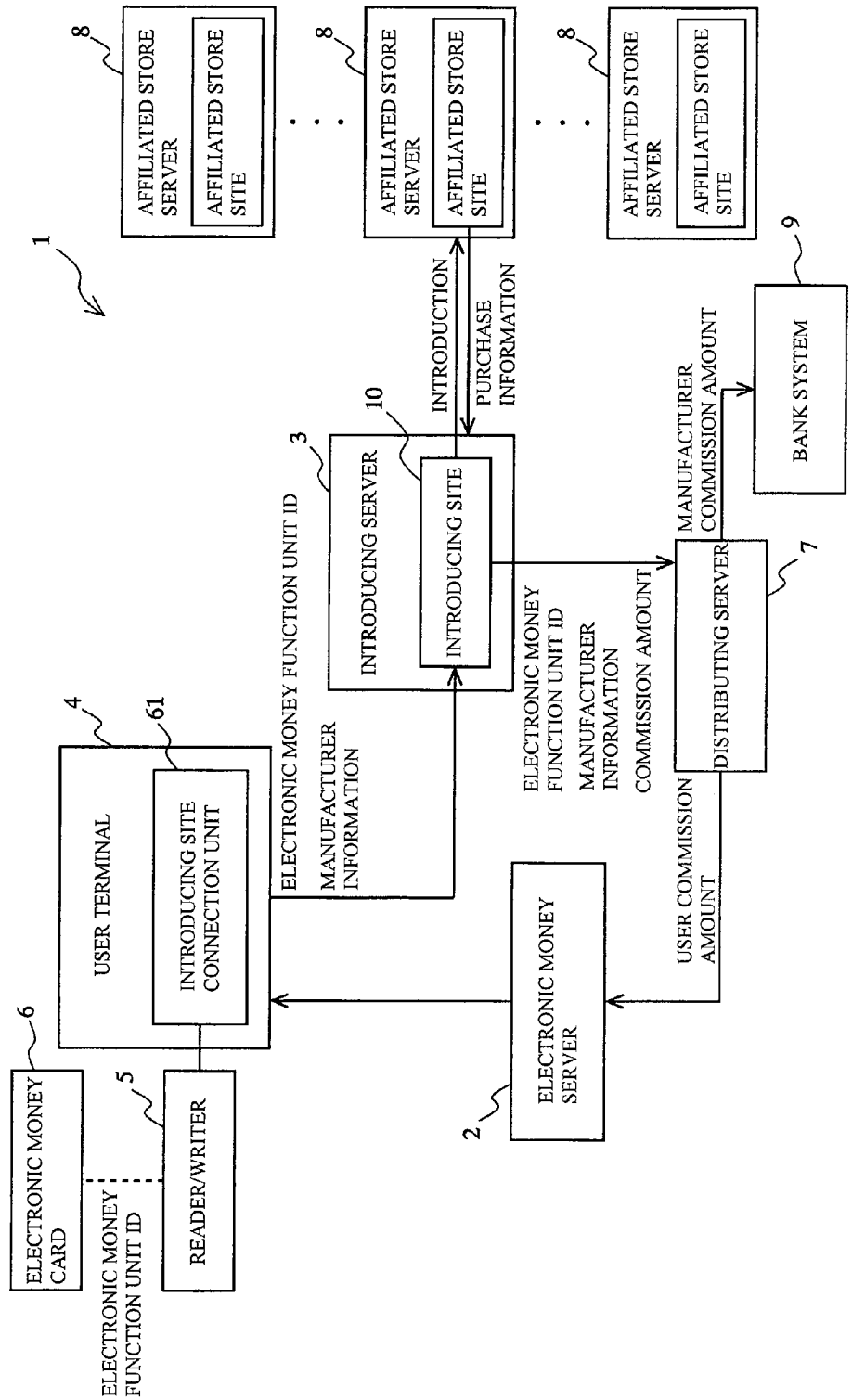
FIG. 1 is a view for explaining a configuration of an advertisement introducing system according to an embodiment.

1 Advertisement introducing system
2 Electronic money server
3 Introducing server
4 User terminal
5 Reader/writer
6 Electronic money card
7 Distributing server
8 Affiliated store server
9 Bank system
10 Introducing site
61 Introducing site connection unit

BEST MODES FOR CARRYING OUT THE INVENTION (1) Outline of Embodiment

When a user sets an electronic money card 6 (FIG. 1) to a reader/writer 5, an introducing site connection unit 61 is activated to connect a user terminal 4 to an introducing site 10. The introducing site connection unit 61 stores manufacturer information that specifies a manufacturer of the user terminal 4, and transmits an electronic money function unit ID (an ID of the electronic money card 6) and the manufacturer information read from the electronic money card 6 to the introducing site 10 when connecting to the introducing site 10. An introducing server 3 connects a user terminal 4 to an affiliated store site of an affiliated store server 8 through the introducing site 10, and transmits purchase information to the introducing server 3 when the user purchases, e.g., a commercial product from the affiliated store site. The introducing server 3 calculates a commission amount from the purchase information and transmits this calculated amount together with the electronic money function unit ID and the manufacturer information to a distributing server 7. The distributing server 7 distributes the commission amount to the electronic money function unit ID and the manufacturer information based on a predetermined distribution ratio. The user and a manufacturer can obtain dividends through this distribution.

(2) Details of Embodiment

FIG. 1 is a view showing a configuration of an advertisement introducing system according to this embodiment.

The advertisement introducing system 1 includes a user terminal 4, a reader/writer 5, an electronic money card 6, an electronic money server 2, an introducing server 3, a distributing server 7, a bank system 9, a plurality of affiliated store servers 8, 8, 8 (which will be referred to as an affiliated store server 8 hereinafter), and others.

The electronic money card 6 is an IC card having a built-in non-contact IC chip, and it stores electronic data representing a monetary value called "value" and can shift the monetary value by increasing or decreasing a money amount of the value.

Although not shown, the electronic money card 6 can be connected with an electronic money terminal installed in, e.g., a store based on near field communication to enable the settlement of a payment by reducing from the electronic money card 6 the value corresponding to a money amount directed from the electronic money terminal.

A non-contact IC chip has an inherent electronic money function unit ID given thereto, and the advertisement introducing system 1 can specify the electronic money card 6 by using this ID.

It is to be noted that processing of increasing a money amount stored in the electronic money card 6 is called "charge" and processing of reducing the same is called "settlement".

The reader/writer 5 is a device that provides an interface when the electronic money card 6 and the user terminal 4 perform communication, and it is incorporated into the user terminal 4 at the time of manufacture of the user terminal 4.

The reader/writer 5 has a built-in antenna, and it is connected with the electronic money card 6 in near field communication.

As a concrete usage pattern, the electronic money card 6 is set to the reader/writer 5 by, e.g., placing the electronic money card 6 on a surface of a part where the reader/writer 5 is installed.

In this embodiment, a situation where the electronic money card 6 is built in the user terminal 4 will be mainly explained, but the reader/writer 5 can be externally disposed to the user terminal 4 as a peripheral device as will be explained later.

The user terminal 4 is composed of, e.g., a personal computer, and it can be connected with the introducing server 3 or the electronic money server 2 through a network, e.g., the Internet.

Incidentally, as the user terminal 4, there are a game console, a television set, a set-top box, a portable terminal such as a mobile phone, a household appliance, and others that can be connected with the network.

The user terminal 4 includes an introducing site connecting program, and the introducing site connection unit 61 is formed when a CPU executes this program.

Here, the introducing site connecting program functions as an advertisement website connecting program.

The introducing site connection unit 61 is a function unit that connects the user terminal 4 to an introducing site 10, and it stores connection information (URL (Uniform Resource Locators)) with respect to the introducing site 10 and commission object person information that specifies a person as a payment target of a commission that is produced when the introducing server 3 sends a user to the affiliated store server 8.

In this embodiment, the commission object person is a manufacturer of the user terminal 4, and manufacturer information that specifies this manufacturer is stored as the commission object person information.

The introducing site connection unit 61 monitors whether the electronic money card 6 is connected with the reader/writer 5, and it detects connection achieved between the reader writer 5 and the electronic money card 6 and starts an operation when a user connects the electronic money card 6 to the reader writer 5.

The introducing site connection unit 61 reads the electronic money function unit ID and the stored manufacturer information from the electronic money card 6.

Further, the introducing site connection unit 61 connects the user terminal 4 to the introducing site 10 to transmit the electronic money function unit ID and the manufacturer information to the introducing site 10.

In this manner, the commission object person information based on sending a customer is transmitted to the introducing server 3 from the user terminal 4.

It is to be noted that the commission is also paid to the user as well as the manufacturer and the electronic money function unit ID is transmitted together with the manufacturer information to the introducing site 10 as the commission object person information in this embodiment.

Furthermore, as a method for transmitting the manufacturer information, the manufacturer information may be attached as a parameter to connection information of the introducing site 10 to be transmitted to the introducing site 10 at the time of connection, or connection information may be prepared in accordance with each manufacturer information and the manufacturer information may be transmitted to the introducing site 10 depending on each connection information that is used to achieve connection.

In this manner, the introducing site connection unit 61 achieves connection to the introducing site 10 specified by the previously stored connection information and thereby transmits the commission object person information to the introducing site 10.

The commission object person may be previously stored in the introducing site connection unit 61 like the manufacturer information, or it may be read from the electronic money card 6 like the electronic money function unit ID.

Furthermore, although the connection information is stored in the introducing site connection unit 61 in this embodiment, it is possible to adopt a configuration where this information is stored in the electronic money card 6 and the introducing site connection unit 61 reads it from the electronic money card 6 and achieves connection to the introducing site 10.

The introducing server 3 is a server device that operates the introducing site 10 and leads to the affiliated store site the connection from the user to the introducing site 10.

In the introducing site 10, advertisements (e.g., banner advertisements) that lead the user to the affiliated store site, e.g., "OO mover for moving house" or "OO shop for furniture, 10%-off sale" are selectively presented. The introducing site 10 functions as an advertisement website.

When the user browses the introducing site and selects any advertisement by using the user terminal 4, information that specifies the advertisement selected by the user is transmitted to the introducing server 3 from the user terminal 4.

Then, the introducing server 3 connects the user terminal 4 to the selected affiliated store site to lead the user to the affiliated store site, thereby sending the user.

When sending the user, the introducing server 3 adopts an introductory ID to generate introductory history data and records the electronic money function unit ID, the manufacturer information, an affiliated store ID, and others in the generated data. Then, the introducing server 3 manages each introductory case by using the introductory history data.

When the user does his/her shopping at the affiliated store site based on introduction from the introducing site 10, the affiliated store server 8 transmits a purchase history to the introducing server 3, and the introducing server 3 collates the introductory history data with the purchase history to calculate a commission amount in each introductory case.

When the introducing server 3 acquires the commission amount in each introductory case as explained above, it informs the distributing server 7 of each commission object person (the electronic money function unit ID, the manufacturer information) and the commission amount.

The affiliated store server 8 is a server device which operates the affiliated store site.

The affiliated store site is a website where commodities or services are sold, and it defrays financial funds of a commission that is paid to each commission object person as a contingency fee when a user is led from the introducing site 10.

The defrayment of the financial funds is, e.g., 5% on sales or 10 yen per achievement of sending a customer regardless of sales, namely, an event that a commission is paid is determined by contract and others.

Moreover, the affiliated store server 8 informs the introducing server 3 of occurrence of such an event.

In this embodiment, when a user purchases a commodity, a commission according to sales is produced, and the affiliated store server 8 transmits purchase information to the introducing server 3.

The distributing server 7 is a server device that tallies and distributes commission amounts in accordance with each commission object person.

The distributing server 7 receives the electronic money terminal ID, the manufacturer information, and the commission amount from the introducing server 3, and assigns the commission amount to the electronic money terminal ID and the manufacturer information in accordance with a predetermined distribution ratio.

A user commission amount assigned to the electronic money terminal ID is returned to the user, and a manufacturer commission amount assigned to the manufacturer information is returned to the manufacturer.

Upon completion of the commission amount distribution processing, the distributing server 7 instructs the bank system 9 to transfer the commission amount to a bank account of each manufacturer in regard to the manufacturer commission amount.

On the other hand, in regard to the user commission amount, the distributing server 7 informs the electronic money server 2 of this amount together with the electronic money function unit ID and transfers the commission amount to a bank account of an operator of the electronic money server 2.

The electronic money server 2 is a server device that charges the electronic money card 6 of a user with a commission amount transferred to a bank account or performs management concerning distribution of the electronic money.

The electronic money server 2 has a service site established as a website where the electronic money card 6 is charged or various services are provided.

Additionally, at the service site, a user can confirm a commission amount or charge the electronic money card 6.

When the user connects the electronic money card 6 to the reader/writer 5, connects the user terminal 4 to the service site, and requests the charge of the commission amount, the electronic money server 2 generates money amount change information required to increase the value corresponding to the commission amount and transmits this information to the electronic money card 6.

The electronic money card 6 performs the charge by using this money amount change information, whereby the user can receive the commission.

As explained above, in the advertisement introducing system 1, when the introducing site connection unit 61 transmits the commission object person information to the introducing site 10, a commission can be paid to each specified commission object person.

It is to be noted that the manufacturer or the user of the user terminal 4 is the commission object person in this embodiment, but this is just an example, and an arbitrary person can be determined as the commission object person.

For example, a sales store of the user terminal 4, a company that issues the electronic money card 6, an enterprise that forms an alliance with an electronic money business, a distribution source of the reader/writer 5, and others can be determined as the commission object persons.

In such a case, information that specifies these commission object persons is stored in the introducing site connection unit 61 or the electronic money card 6 in advance so that this information can be transmitted to the introducing site 10 from the introducing site connection unit 61.

Figure 2:
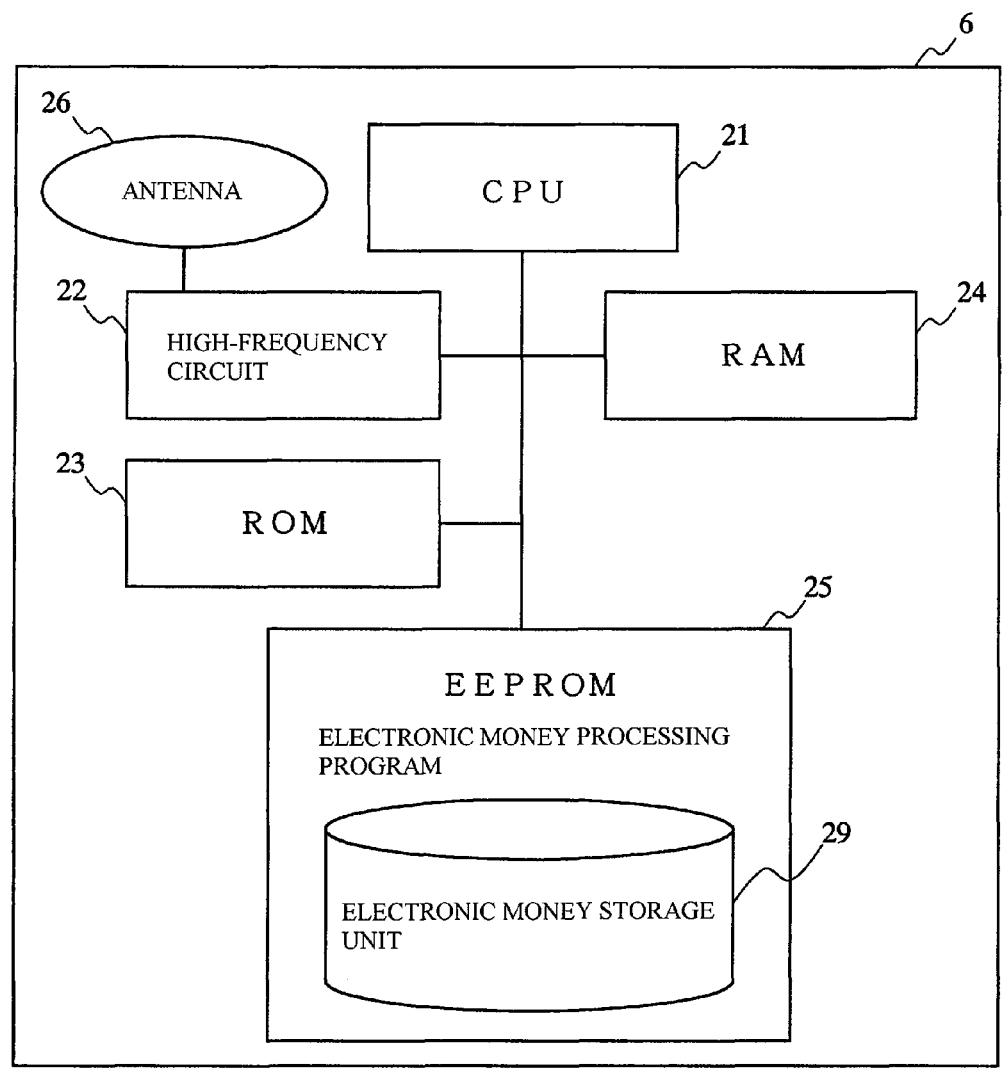
FIG. 2 is a block diagram showing an example of a hardware configuration of an electronic money card.

FIG. 2 is a block diagram showing an example of a hardware configuration of the electronic money card 6.

The electronic money card 6 has a CPU (Central Processing Unit) 21, a high-frequency circuit 22, an antenna 26, a ROM (Read Only Memory) 23, a RAM (Random Access memory) 24, an EEPROM (Electronically Erasable and Programmable ROM) 25, and others.

These elements are formed on an IC chip, and this IC chip functions as a monetary terminal that stores a balance (a value balance) of a monetary value (the value).

However, the antenna 26 is composed of a standard antenna set up near an outer edge portion in the electronic money card 6 or on an elliptic curve having a diagonal line of the electronic money card 6 being determined as an axis, and an end portion of the antenna 26 is connected with the IC chip.

The CPU 21 is a central processing unit that performs information processing in accordance with various programs stored in the ROM 23 or the EEPROM 25, and it executes money amount change processing of changing a money amount of a stored value balance, e.g., settlement processing or charge.

The CPU 21 can perform near field communication with the reader/writer 5 through the antenna 26 and the high-frequency circuit 22.

The antenna 26 is an antenna that performs transmission/reception by using the antenna built in the reader/writer 5 of the user terminal 4 and electric waves, and it generates electric power required to drive the IC chip by using electric waves from the reader/writer 5 besides performing transmission/reception of various kinds of information.

The high-frequency circuit 22 converts a high frequency transmitted from the reader/writer 5 to the antenna 26 into a digital signal to be output to the CPU 21 or converts a digital signal output from the CPU 21 into a high frequency to be transmitted to the reader/writer 5 from the antenna 26.

The RAM 24 is a memory which provides a working memory when the CPU 21 executes information processing and into/from which data can be written/read as required.

In this embodiment, when the CPU 21 transmits the electronic money function unit ID to the user terminal 4 or executes money amount change processing, this memory is utilized as a temporary storage region.

The ROM 23 is a read-only memory that stores basic programs, parameters, data and others allowing the electronic money card 6 to function.

The EEPROM 25 is a ROM into/from which information can be written/erased. Information stored in the EEPROM 25 can be maintained even when no power is supplied to the electronic money card 6.

In the EEPROM 25, an electronic money processing program that allows the electronic money card 6 to exercise a function as the electronic money card is stored, and an electronic money storage unit 29 that stores various kinds of data, e.g., an electronic money function unit ID, a value balance, log data, and others is formed.

Figure 3:
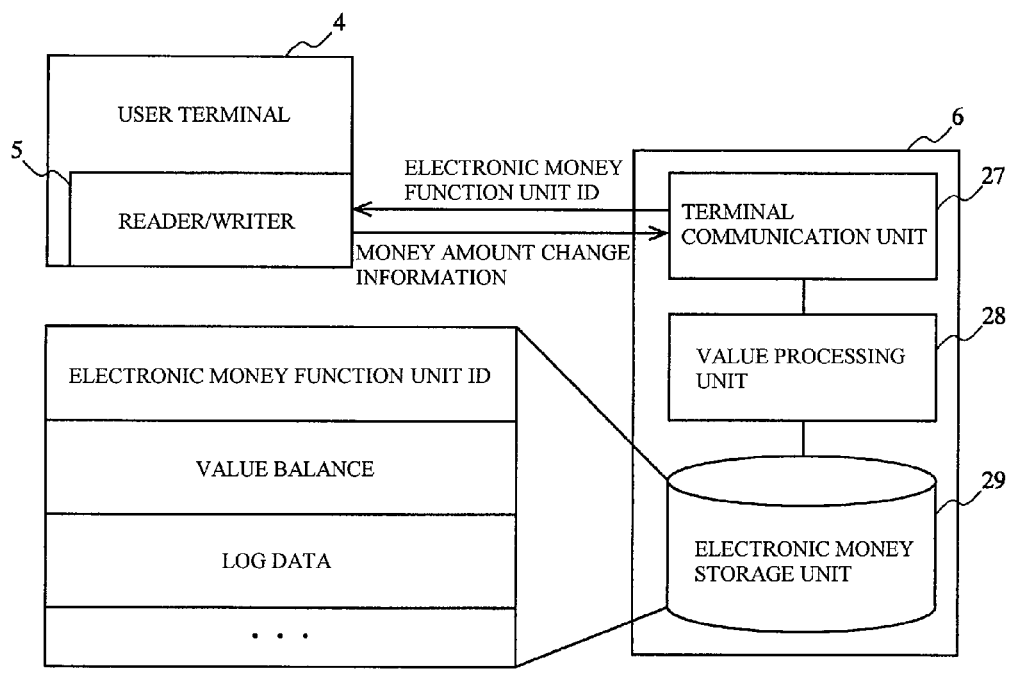
FIG. 3 is a block diagram schematically showing a functional configuration of the electronic money card.

FIG. 3 is a block diagram schematically showing a functional configuration of the electronic money card 6 when the CPU 21 executes the electronic money processing program.

The electronic money storage unit 29 formed in the EEPROM 25 stores an electronic money function unit ID, a value balance, log data, and others.

The value balance is a balance of the currently stored value, and the electronic money card 6 can perform settlement processing by reducing this value balance in, e.g., an electronic money terminal installed in a store.

In this manner, the electronic money storage unit 29 functions as money amount storing means for storing an amount of a monetary value as electronic data (the value).

The log data is log data having value processing contents and others recorded therein, and it is formed of a date, hours, minutes, and seconds of processing, a charge amount, a settlement amount, and others.

A terminal communication unit 27 is formed by using the antenna 26 or the high-frequency circuit 22 and intermediates communication between the user terminal 4 and a value processing unit 28 by, e.g., receiving a later-explained ID reference command or money amount change information from the reader/writer 5 of the user terminal 4 or other commands and inputting them to the value processing unit 28.

The value processing unit 28 is an information processing unit that executes various kinds of command.

As commands, there are the money amount change information, the ID reference command, a balance reference command, and others.

The money amount change information is a command that allows the value processing unit 28 to execute the money amount change processing.

When the value processing unit 28 executes the money amount change processing, it increases/decreases a value balance by an amount specified by the money amount change information.

The ID reference command is a command that allows the value processing unit 28 to read an electronic money function unit ID, and the value processing unit 28 reads an electronic money function unit ID from the electronic money storage unit 29 and outputs it when the ID reference command is input.

The balance reference command is a command that allows the value processing unit 28 to read a value balance, and the value processing unit 28 reads a value balance from the electronic money storage unit 29 and outputs it when the balance reference command is input.

Although the configuration of the electronic money card 6 has been described, a configuration that the same IC chip as that incorporated in the electronic money card 6 is mounted on a mobile phone or any other portable terminal is generally extensively used.

Figure 4:
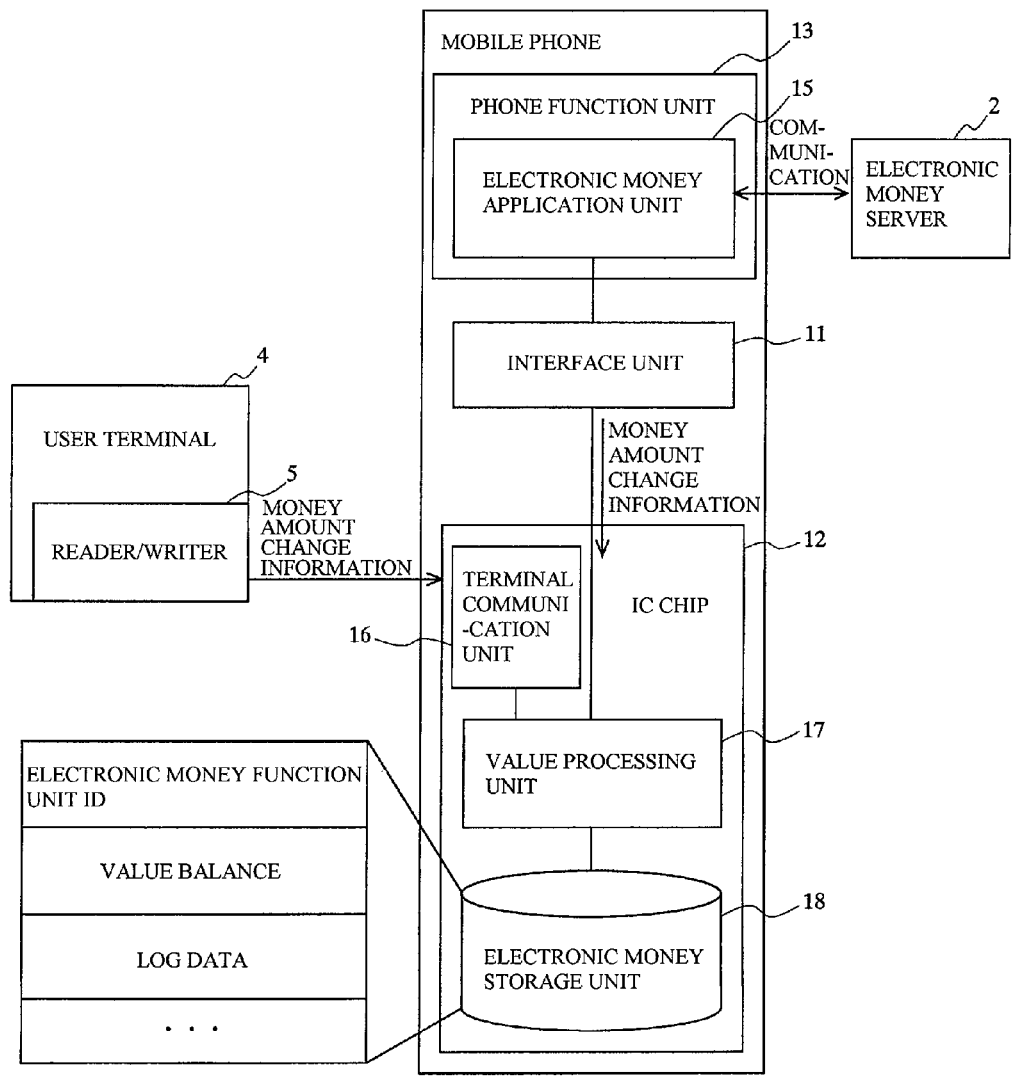
FIG. 4 is a conceptual view showing an example of a functional configuration of a mobile phone.

FIG. 4 is a conceptual view showing an example of a configuration of a mobile phone having an IC chip incorporated therein.

The mobile phone includes a phone function unit 13 and an IC chip 12, and both the members are connected with each other through an interface unit 11.

The IC chip 12 has the same function as the IC chip incorporated in the electronic money card 6, and it has a function of outputting an electronic money function unit ID or executing the money amount change processing, for example.

The phone function unit 13 has a call mode for making a call and an application mode, and these modes can be switched by an operation from a user.

The phone function unit 13 includes a CPU and a storage unit having various kinds of application programs stored therein, and various kinds of application functions can be exercised when the CPU executes these application programs in the application mode.

An electronic money application unit 15 is formed when the CPU of the phone function unit 13 executes an electronic money application program.

The electronic money application unit 15 can access both the electronic money server 2 and the IC chip 12 and can intermediate communication between the electronic money server 2 and the IC chip 12.

The IC chip 12 is connected with the electronic money application unit 15 through the interface unit 11.

In the IC chip 12, a terminal communication unit 16, a value processing unit 17, an electronic money storage unit 18, and others are formed when the CPU executes an electronic money program stored in the EEPROM in the IC chip like the electronic money card 6. These functions are the same as those in the electronic money card 6 in FIG. 3.

The value processing unit 17 can communicate with the user terminal 4 through the terminal communication unit 16 to output an electronic money function unit ID or execute the money amount change processing like the electronic money card 6 and can also receive the money amount change information from the electronic money server 2 through the electronic money application unit 15 to execute the money amount change processing.

Since the mobile phone can communicate with the electronic money server 2 through the electronic money application unit 15 in this manner, the mobile phone can be connected with the electronic money server 2 through the electronic money application unit 15 to charge the IC chip 12 with a commission.

Figure 5:
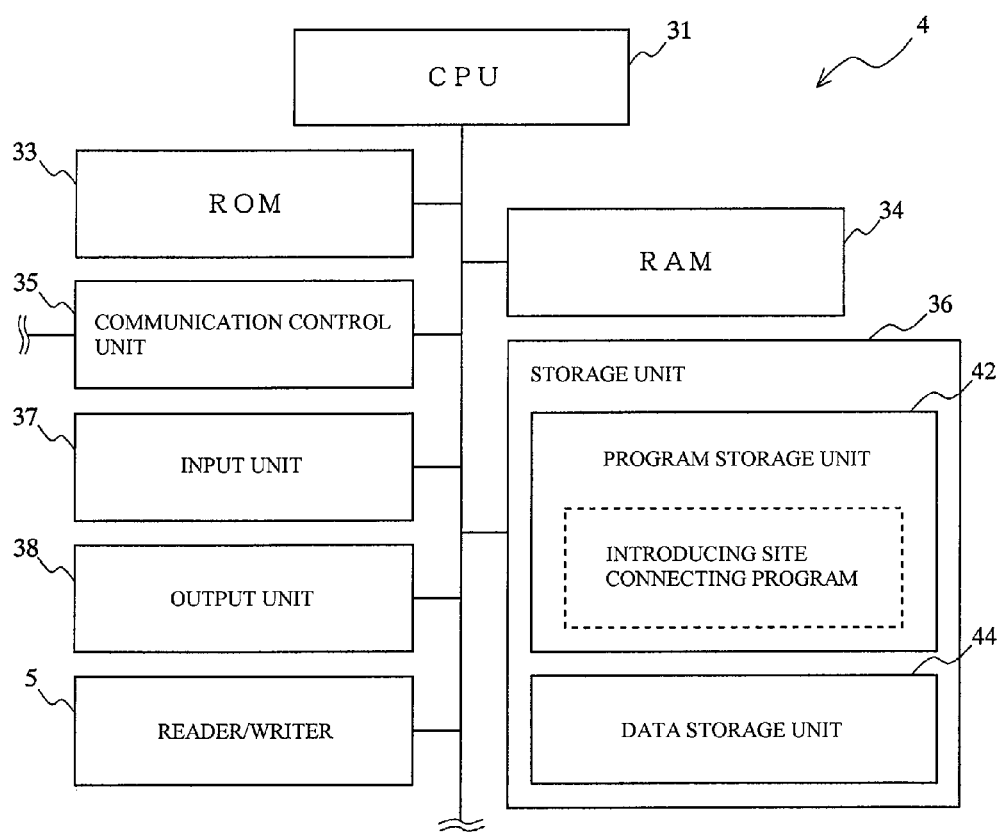
FIG. 5 is a view showing an example of a hardware configuration of a user terminal.

FIG. 5 is a view showing an example of a hardware configuration of the user terminal 4.

The user terminal 4 is configured by connecting a CPU 31, a ROM 33, a RAM 34, a communication control unit 35, a storage unit 36, an input unit 37, an output unit 38, a reader/writer 5, and others through a bus line.

The CPU 31 executes information processing in accordance with a predetermined program and also performs, e.g., control over the entire user terminal 4.

In this embodiment, the CPU 31 executes an introducing site program and thereby operates the introducing site connection unit 61 to connect the user terminal 4 to the introducing site 10, reads an electronic money function unit ID from the electronic money card 6, or transmits an electronic money function unit ID and manufacturer information to the introducing site 10.

The ROM 33 is a read-only memory that stores basic programs or parameters required to operate the user terminal 4.

The RAM 34 is a continually-writable/readable memory that provides a working memory for the CPU 31 or loads and stores a program or data stored in the storage unit 36.

The communication control unit 35 is a connection device which connects the user terminal 4 to the introducing site 10 or any other server device through a network.

The input unit 37 is configured by using an input device such as a keyboard or a mouse, and it accepts an operation when a user selects the affiliated store site in the introducing site or purchases a commodity at the affiliated store site.

The output unit 38 is formed of an output device such as a display, a speaker, or a printer, and it displays a screen of the introducing site 10 or the affiliated store site or generates sound.

The reader/writer 5 has a built-in antenna and performs wireless communication with the IC chip of the electronic money card 6.

An intrinsic reader/writer ID is given to the reader/writer 5, and the user terminal 4 can read the reader/writer ID from the reader/writer 5.

The reader/writer ID is used by the introducing server 3 to judge whether the reader/writer 5 is an authentic reader/writer when the later-explained reader/writer 5 is externally provided.

The storage unit 36 includes: a program storage unit 42 which is formed of, e.g., a hard disk, any other memory medium, and a driving device for driving them and stores various kinds of programs; a data storage unit 44 that stores data; and others.

The program storage unit 42 stores an OS as a basic program that allows the user terminal 4 to function, an introducing site connection program that is used by the CPU 31 to realize the introducing site connection unit 61.

The data storage unit 44 stores data and the like utilized by a user.

Figure 6:
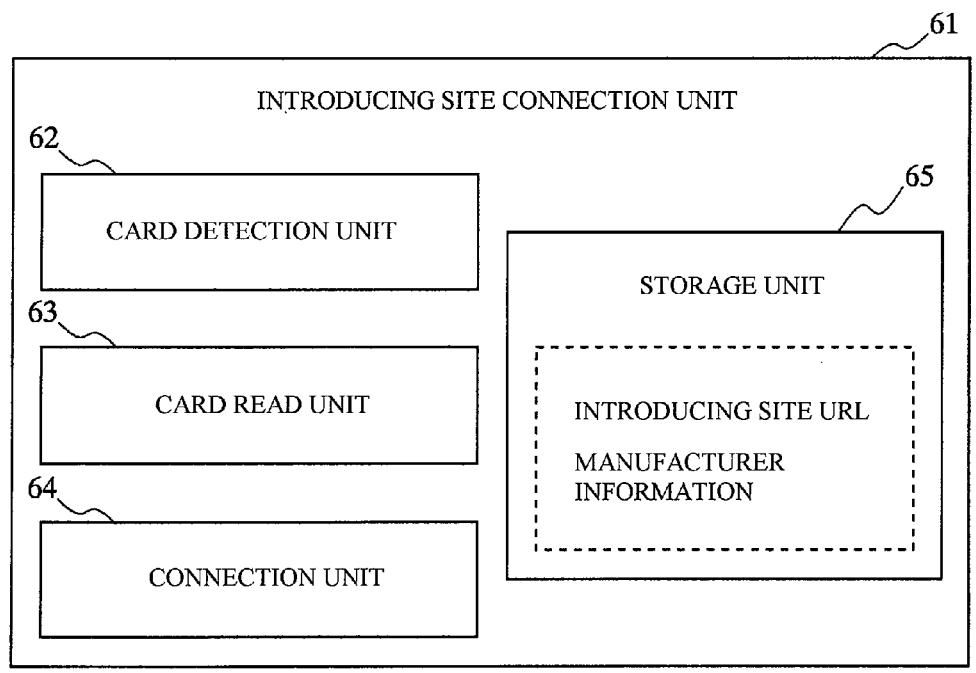
FIG. 6 is a view for explaining a functional configuration of an introducing site connection unit.

FIG. 6 is a block diagram for explaining a functional configuration of the introducing site connection unit 61.

The introducing site connection unit 61 includes a card detection unit 62, a card read unit 63, a connection unit 64, a storage unit 65, and others.

These function units are formed by executing the introducing site connection program in the CPU 31 (FIG. 5).

The card detection unit 62 monitors whether the electronic money card 6 is connected with the reader/writer 5.

Although a user indicates his/her intention to request connection by, e.g., placing the electronic money card 6 on the reader/writer 5 when connecting the user terminal 4 to the introducing site 10, the card detection unit 62 confirms connection achieved between the electronic money card 6 and the reader/writer 5 to detect the connection request from the user.

In this manner, the introducing site connection program realizes a detecting function for detecting that the IC chip of the electronic money card 6 is connected with the reader/writer 5.

When the card detection unit 62 detects the electronic money card 6, the card read unit 63 transmits an ID reference command to the electronic money card 6 to read an electronic money function unit ID from the electronic money card 6.

As explained above, the introducing site connection program realizes an IC chip information acquiring function for acquiring IC chip information (the electronic money function unit ID) that specifies the IC chip from the IC chip of the electronic money card 6 from which connection has been detected.

The connection unit 64 activates a browser, also reads an URL of the introducing site from the storage unit 65, and inputs the read URL to the browser, thereby connecting the user terminal 4 to the introducing site 10.

In this manner, when connection of the IC chip of the electronic money card 6 is detected, the introducing site connection program realizes a connecting function for connecting a customer terminal (the user terminal 4) to a predetermined advertisement website (the introducing site 10).

Further, the connection unit 64 transmits an electronic money function unit ID read from the electronic money card 6 and manufacturer information stored in the storage unit 65 to the introducing site 10.

It is to be noted that, when the manufacturer information is attached to the URL of the introducing site 10, the introducing site 10 is informed of the manufacturer information simultaneously with connection to the introducing site 10.

As explained above, the introducing site connection program realizes a commission object person information transmitting function for transmitting previously stored commission object person information to the advertisement website (the introducing site 10) connected by using connection information.

Furthermore, when attaching the manufacturer information to the connection information or when setting the connection information in accordance with each manufacturer, the commission object person information is included in the connection information.

Moreover, the introducing site connection program realizes an IC chip information transmitting function for acquiring IC chip information (an electronic money function unit ID) that specifies an IC chip from the IC chip of the electronic money card 6 from which connection has been detected and transmitting the acquired information to the advertisement website (the introducing site 10).

The storage unit 65 stores information (the manufacturer information in this example) that specifies an URL of the introducing site 10 or a commission object person.

In this manner, the introducing site connection program realizes a commission object person information storing function for storing commission object person information that specifies a commission object person who receives a commission based on past results of leading a customer (a user) to a business transaction website (the affiliated store site) through a predetermined advertisement website (the introducing site 10).

As explained above, the user terminal 4 functions as an information processing device including: storing means for storing an advertisement website connecting program (an introducing site connecting program); executing means for executing this advertisement website program; and the reader/writer 5 that accesses the IC chip of the electronic money card 6.

Figure 7:
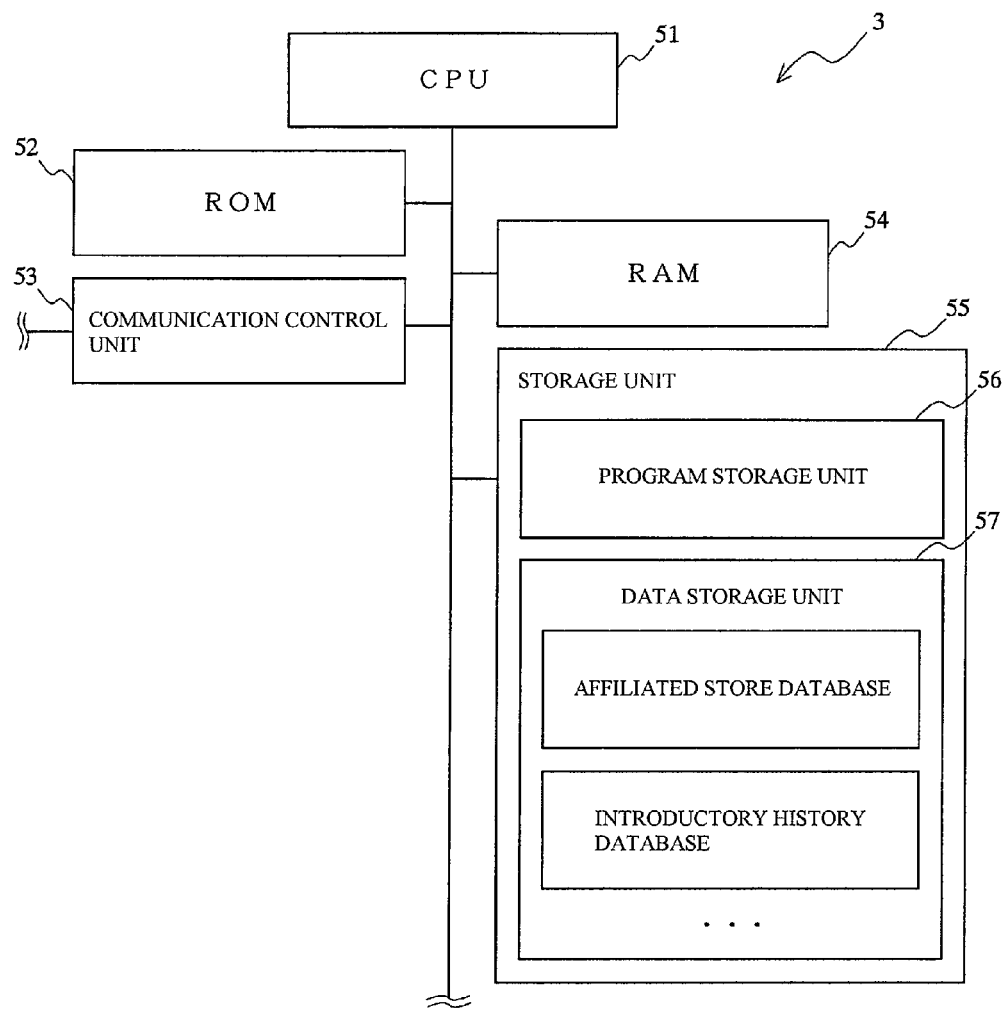
FIG. 7 is a view showing an example of a hardware configuration of an introducing server.

FIG. 7 is a view showing an example of a hardware configuration of the introducing server 3.

The introducing server 3 has a CPU 51, a ROM 52, a RAM 54, a communication control unit 53, a storage unit 55, and others connected through a bus line, and in the advertisement introducing system 1, it functions as a server device that accepts access from a customer terminal (the user terminal 4) and operates an advertisement website (the introducing site 10) that leads a customer to a business transaction website (the affiliated store site) of a store.

The CPU 51 is a central processing unit that executes various kinds of information processing in accordance with a predetermined program. In this embodiment, it receives an electronic money function unit ID or manufacturer information from the user terminal 4 to generate introductory history data, and intermediates connection from the user terminal 4 to the affiliated store server 8, or calculates a commission amount from purchase information from the affiliated store server 8 to be collated with introductory history data.

The ROM 52 is a read-only memory, and it stores basic programs or parameters that are used to operate the introducing server 3.

The RAM 54 is a readable/writable memory that provides a working memory for the CPU 51 or loads and stores programs or data stored in the storage unit 55.

The communication control unit 53 is a control unit that is used to communicate with the user terminal 4, the affiliated store server 8, the distributing server 7, and others.

The storage unit 55 is formed of a high-capacity storage device such as a hard disk, and it includes a program storage unit 56 storing various kinds of programs, a data storage unit 57 storing data, and others.

The program storage unit 56 stores an OS as a basic program that allows the introducing server 3 to function, an introducing site program that allows the CPU 51 to realize the introducing site 10, and other programs.

The data storage unit 57 stores an affiliated store database, an introductory history database, and others.

The affiliated store database includes connection information that is used to connect the user terminal 4 to the affiliated store site or affiliated store data having an affiliated store ID, a name, and contact information of each affiliated store recorded therein.

In the introductory history database, introductory history data of each introductory case is stored.

Further, although not shown, a purchase information database storing purchase information transmitted from the affiliated store server 8 is also formed in the data storage unit 57.

FIG. 8 is a view showing a logical configuration of the introductory history database.

The introductory history database is a database storing introductory history data stored therein, and the introductory history data includes an "introductory ID", an "introductory date and hour", an "electronic money function unit ID", "manufacturer information", an "affiliated store ID", a "commission amount", and other items.

The "introductory ID" is ID information adopted by the introducing server 3 every time the user terminal 4 is connected with the affiliated store server 8 (i.e., every time a user is sent to the affiliated store site).

The introductory history data is created by accessing the affiliated store server 8 even when a user does not purchase a commodity in the affiliated store server 8.

The "introductory date and hour" is a date and hour when the user terminal 4 is connected to the affiliated store server 8.

The "electronic money function unit ID" is an electronic money function unit ID received from the user terminal 4.

The "manufacturer information" is manufacturer information received from the user terminal 4.

The "affiliated store ID" is an affiliated store ID of the affiliated store server 8 connected with the user terminal 4.

The "commission amount" is a commission amount calculated from purchase information transmitted from the affiliated store server 8 by the introducing server 3.

The introducing server 3 collectively transmits pieces of data each having a collated commission amount in introductory history data stored in the introductory history database to the distributing server 7, e.g., approximately once a day.

The distributing server 7 will now be described.

Although not shown, a hardware configuration of the distributing server 7 is basically the same as the introducing server 3.

The distributing server 7 receives and stores the introductory history data from the introducing server 3. Further, it tallies the data while making reference to a distribution table and generates user commission amount data and manufacturer commission amount data.

FIG. 9(*a*) shows a logical configuration of the distribution table.

The distribution table is a table storing a ratio for distributing a commission to commission object persons.

In the illustrated example, a ratio of a user is 50% whilst a ratio of a manufacturer is 50%, and the distributing server 7 distribute 50% of a commission amount to each of the user and the manufacturer.

FIG. 9(*b*) is a view showing a logical configuration of user commission amount data, and FIG. 9(*c*) is a view showing a logical configuration of manufacturer commission amount data.

The user commission amount data is data obtained by tallying a commission for the user from the introductory history data based on the ratio in the distribution table, and an electronic money function unit ID is associated with a commission amount distributed to a user.

On the other hand, the manufacturer commission amount data is data obtained by tallying a commission for the manufacturer from the introductory history data based on the ratio in the distribution table, and a commission amount is associated with the manufacturer.

The distributing server 7 outputs the user commission amount data to a file to be transmitted to the electronic money server 2, and outputs the manufacturer commission amount data to a file to be transmitted to the bank system 9.

A procedure that the advertisement introducing system 1 sends a customer to the affiliated store site will now be described with reference to a flowchart of FIG. 10.

First, a user sets the electronic money card 6 to the reader/writer 5 to request the user terminal 4 to be connected with the introducing site 10.

The user terminal 4 detects that the electronic money card 6 has been connected to the reader/writer 5, thereby accepting the request to achieve connection to the introducing site 10 (a step 5).

It is to be noted that this embodiment adopts the scheme that the user terminal 4 monitors connection of the electronic money card 6 and a connection request is automatically accepted when the electronic money card 6 is detected, but any other conformations can be used.

For example, the present invention can be configured in such a manner that indication of an intention of a connection request is accepted from a user by clicking a connection request button and then a message, e.g., "please set your electronic money card to the reader/writer" is issued to the user to urge the user to set the electronic money card 6 to the reader/writer 5.

Subsequently, the user terminal 4 transmits an ID reference command to the electronic money card 6 to request transmission of an electronic money function unit ID (a step 10).

The electronic money card 6 receives the ID reference command from the user terminal 4, executes this command, and transmits the electronic money function unit ID to the user terminal 4 (a step 15).

The user terminal 4 receives the electronic money function unit ID from the electronic money card 6 and temporarily stores this ID.

Then, the user terminal 4 reads connection information with respect to the introducing site 10 and manufacturer information, uses the connection information to achieve connection to the introducing site 10, and transmits the electronic money function unit ID and the manufacturer information to the introducing server 3 (a step 20).

The introducing server 3 accepts the connection from the user terminal 4 and stores the electronic money function unit ID and the manufacturer information upon receiving them from the user terminal 4 (a step 25).

In this manner, the introducing server 3 includes connection accepting means for accepting the connection to an advertisement website (the introducing site 10) from a customer terminal (the user terminal 4).

Furthermore, the introducing server 3 includes commission object person information acquiring means for acquiring from the customer terminal (the user terminal 4) commission object person information (the electronic money function unit ID and the manufacturer information) that specifies commission object persons who receive commissions based on past results of leading customers.

Then, the introducing server 3 transmits introducing site screen data that is used to display an introducing site screen to the user terminal 4 (a step 30).

The user terminal 4 receives the introducing site screen data from the introducing server 3 and uses this data to display the introducing site screen in a display.

A user makes reference to the introducing site screen and selects a desired one from a list of the affiliated store sites (a step 35).

When the user selects the affiliated store site, the user terminal 4 transmits information that specifies the affiliated store site to the introducing site 10.

Upon receiving this information, the introducing server 3 detects the affiliated store site selected by the user and issues an introductory ID. Further, the introducing server 3 connects the user terminal 4 to the corresponding affiliated store server 8 and transmits the introductory ID to the affiliated store server 8 (a step 40).

In this manner, the introducing server 3 includes leading means for leading a customer (the user) to a business transaction website by connecting a customer terminal (the user terminal 4) that has accepted the connection to the business transaction website (the affiliated store site).

Further, the introducing server 3 associates the electronic money function unit ID and the manufacturer information received from the user terminal 4 and an affiliated store ID of the affiliated store server 8 selected by the user with the introductory ID to generate introductory history data.

Furthermore, the introducing server 3 registers the generated introductory history data in the introductory history database (a step 45).

The affiliated store server 8 accepts the connection from the user terminal 4 based on the intermediacy of the introducing server 3, and receives and stores the introductory ID from the user terminal 4.

After achieving the connection to the affiliated store server 8, the user terminal 4 performs a business transaction by an operation from the user to inform the affiliated store server 8 of purchase of a commodity (a step 50).

On the other hand, the affiliated store server 8 performs commodity sales processing, e.g., creating sales data (a step 55).

The affiliated store server 8 records the introductory ID in the sales data and also records which introductory case has achieved the transaction when the business transaction with the user is attained.

The affiliated store server 8 stores the sales data in this manner, tallies the sales data, e.g., approximately once a day, and calculates a sales amount in accordance with each introductory ID.

Moreover, the affiliated store server 8 generates purchase information including each introductory ID associated with the sales amount, and transmits the generated information to the introducing server 3 (a step 60).

Additionally, a commodity purchased by the user or any other information can be added to the purchase information.

The introducing server 3 receives the purchase information from the affiliated store server 8 and stores it in the purchase information database.

Further, the introducing server 3 assigns a purchase amount to a predetermined computational expression to calculate a commission amount (e.g., 5% on sales) in accordance with each introductory ID and associates each introductory ID with the commission amount.

As explained above, the introducing server 3 includes commission amount acquiring means for acquiring a commission amount based on past results of leading users.

Then, the introducing server 3 collates the introductory ID having the commission amount calculated with the introductory IDs in the introductory history data and additionally registers the corresponding commission amount in the introductory history data.

In this manner, the introducing server 3 includes storing means for storing commission object person information and this commission amount in association with each other.

As explained above, the introducing server 3 can generate the introductory history data having the electronic money function unit ID, the manufacturer ID, and the commission amount associated with each other.

Figure 11:
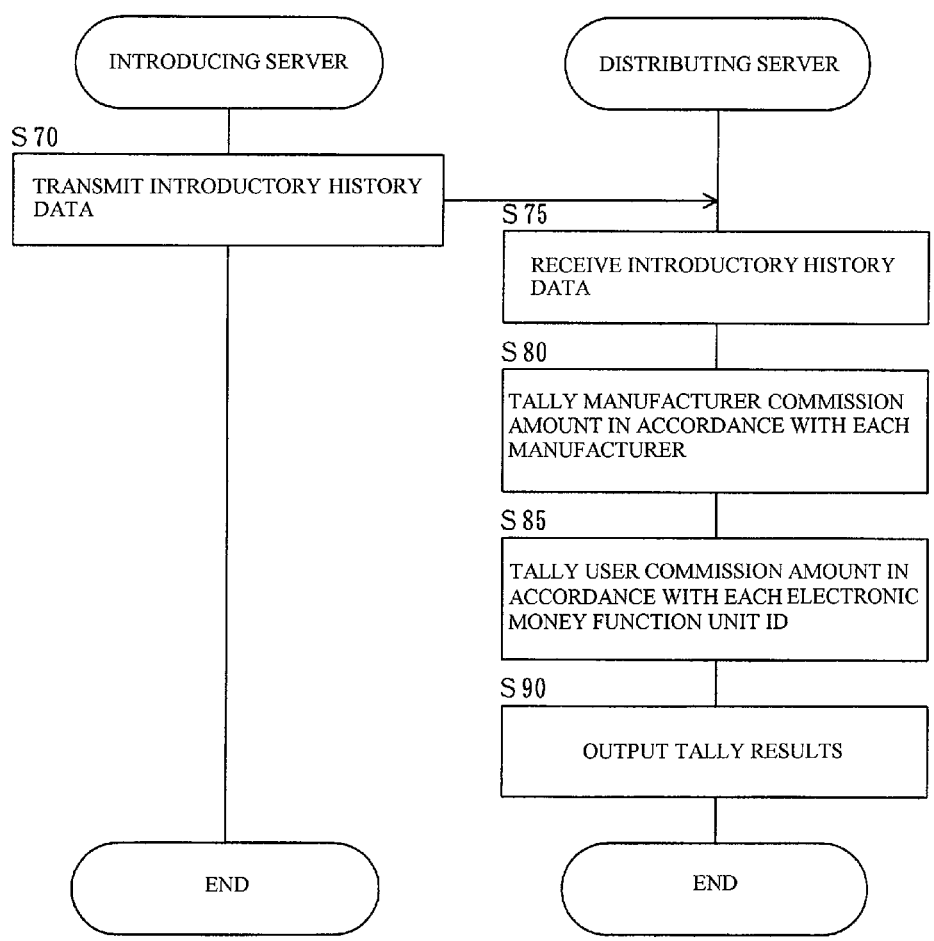
FIG. 11 is a flowchart for explaining a procedure of distributing a commission amount by the distributing server.

A procedure that the advertisement introducing system 1 distributes a commission amount to commission object persons will now be explained with reference to a flowchart of FIG. 11.

The introducing server 3 first extracts data having a commission amount additionally registered from the introductory history database and transmits the extracted data to the distributing server 7 (a step 70). This processing is carried out as a batch process, e.g., approximately once a day.

The distributing server 7 receives the introductory history data from the introducing server 3 and stores this received data (a step 75).

The distributing server 7 calculates a manufacturer commission amount in accordance with each introductory history data while making reference to the distribution data, and tallies results in accordance with each manufacturer (a step 80).

Subsequently, the distributing server 7 calculates a user commission amount associated with the electronic money function unit ID in accordance with each introductory history data while making reference to a dividend table, tallies results in accordance with each electronic money function unit ID (a step 85).

Furthermore, the distributing server 7 outputs these tally results to, e.g., a file (a step 90).

Thereafter, the distributing server 7 transmits the thus output manufacture commission amount file to the bank system 9, and transmits the user commission amount file to the electronic money server 2.

As explained above, the commission offered by providing financial funds from the affiliated store is returned to the manufacturer of the user terminal 4 and the user who has purchased a commodity.

Here, the return to the user is performed by using the electronic money as follows.

The electronic money server 2 receives the user commission amount file from the introducing server 3, analyzes this file, acquires a commission amount for each electronic money function unit ID, and stores this amount.

Then, the electronic money server 2 informs the user of the return of the commission through, e.g., an electronic mail.

Upon receiving this mail, the user connects the electronic money card 6 to the reader/writer 5, thereby connecting the user terminal 4 to a service site of the electronic money server 2.

The electronic money server 2 acquires the electronic money function unit ID of the electronic money card 6 and confirms the commission amount generated with respect to the electronic money function unit ID.

Then, the electronic money server 2 generates money amount change information that is required for charge of the commission amount and transmits this information to the electronic money card 6.

The electronic money card 6 receives the money amount change information from the electronic money server 2, carries out this change, and performs the charge of the value corresponding to the commission amount.

An example where the reader/writer 5 is of a detachable type and it is externally provided to the user terminal 4 will now be explained.

In this case, the reader/writer 5 is distributed together with a memory medium having an introducing site connecting program stored therein.

This introducing site connecting program stores a distributor of the reader/writer 5 or relevant parties thereof as commission object persons.

It is to be noted that the introducing site connecting program may be downloaded and distributed from a predetermined website.

Upon receiving the distribution of the reader/writer 5 and the memory medium, the user connects the reader/writer 5 to the user terminal 4 and uses the memory medium to install the introducing site connecting program in the user terminal 4.

Figure 12:
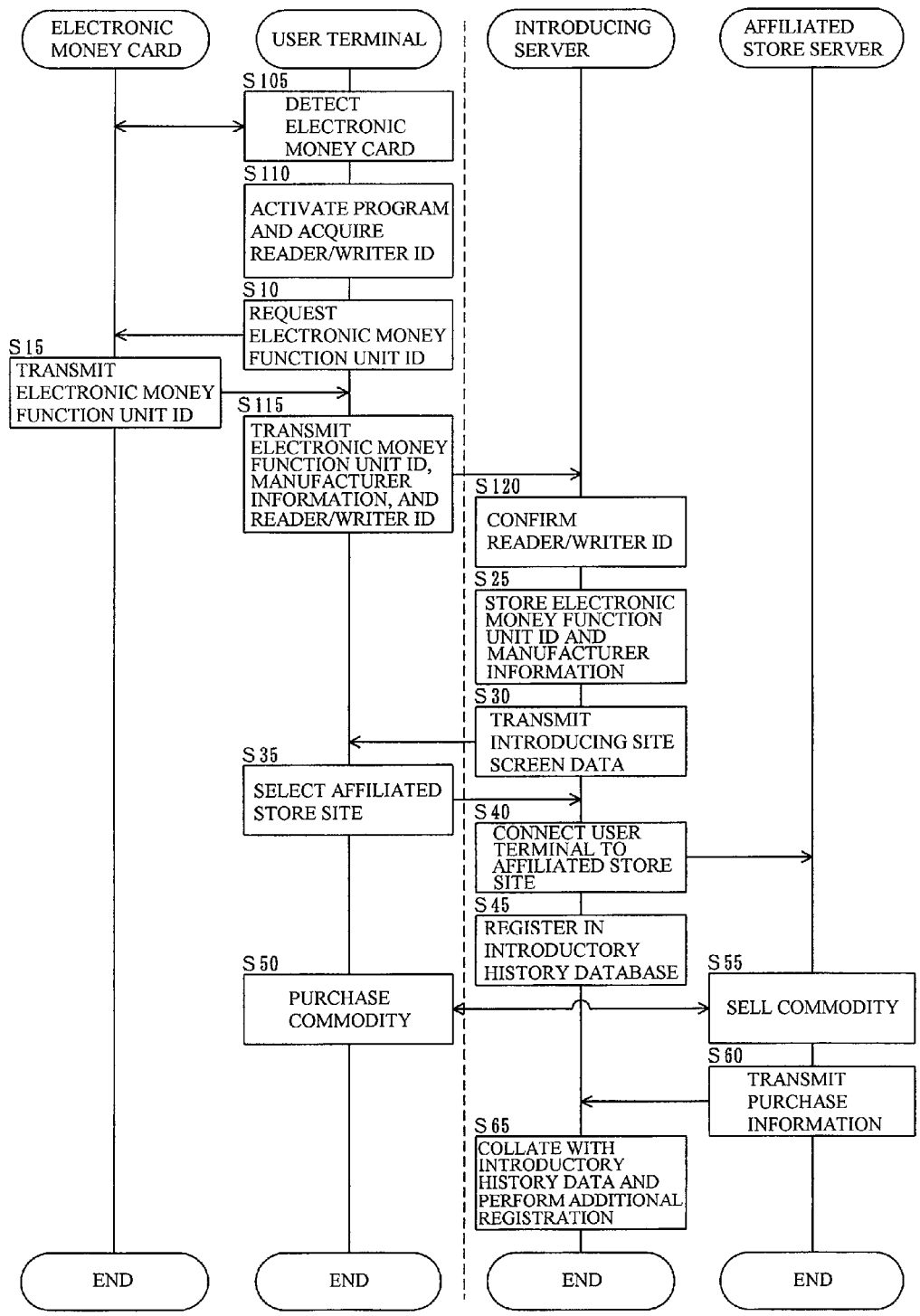
FIG. 12 is a flowchart for explaining a procedure of sending a user to the introducing site when a reader/writer is externally provided.

A procedure of introduction using the thus configured user terminal 4 will now be described with reference to a flowchart of FIG. 12.

Figure 10:
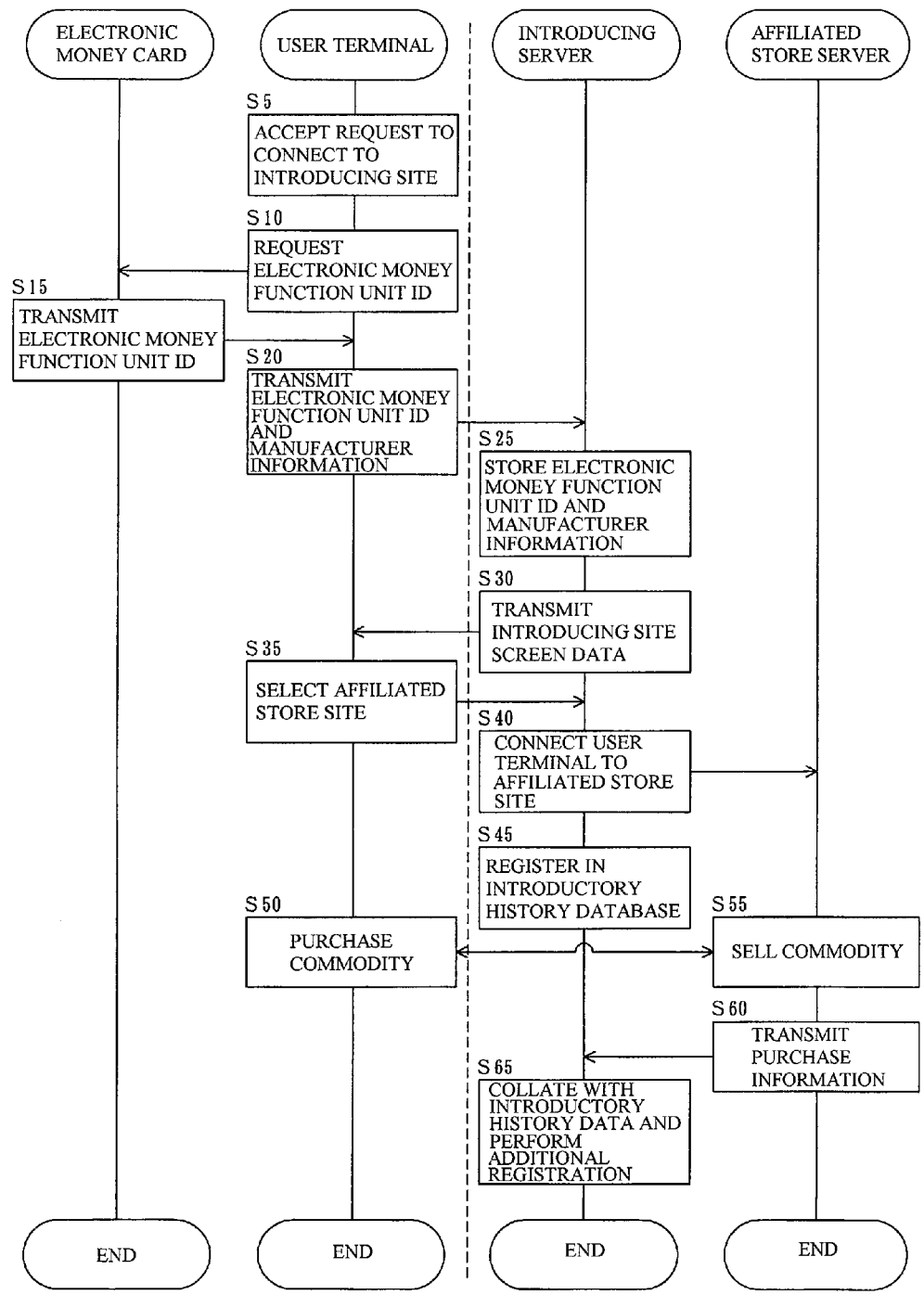
FIG. 10 is a flowchart for explaining a procedure of sending a user to an introducing site.

However, like step numbers denote the same pieces of processing as those in the flowchart of FIG. 10, thereby omitting/simplifying the explanation.

First, when the user terminal 4 detects the electronic money card 6 through the reader/writer 5 (a step 105), it activates the introducing site connecting program to acquire a reader/writer ID from the reader/writer 5. (a step 110).

Then, the user terminal 4 requests the electronic money card 6 to send the electronic money function unit ID (the step 10), and the electronic money card 6 transmits the electronic money function unit ID to the user terminal 4 in response to this request (the step 15).

Subsequently, the user terminal 4 transmits the electronic money function unit ID, the manufacturer information, and the reader/writer ID to the introducing server 3 (a step 115).

The introducing server 3 receives these pieces of data and confirms the reader/writer ID (a step 120).

The introducing server 3 has a database storing the reader/writer ID of the genuine reader/writer 5 in advance, and the reader/writer 5 is confirmed as a genuine product when the database has the reader/writer ID of the reader/writer 5 received from the user terminal 4.

The introducing server 3 continues the following processing when the reader/writer 5 is the genuine product. The following pieces of processing at the step 25 and the following steps are the same as those in FIG. 10.

Furthermore, when the reader/writer 5 is not the genuine product, the introducing server 3 transmits an error message to the user terminal 4 and terminates the processing.

In the above-explained embodiment, the electronic money function unit ID and the manufacturer information are transmitted to the introducing site 10 to return the commission to the user and the manufacturer, but the electronic money function unit ID does not have to be transmitted if the manufacturer information alone can suffice.

In this case, when the user sets the electronic money card 6 to the reader/writer 5, the introducing site connection unit 61 detects this card and transmits the manufacturer information to the introducing site 10.

Moreover, although the introducing server 3, the distributing server 7, and the electronic money server 2 are explained as different server devices in this embodiment, the present invention is not restricted thereto, and a server device having functions of the introducing server 3 and the distributing server 7, a server device having functions of the introducing server 3 and the electronic money server 2, a server device having functions of the distributing server 7 and the electronic money server 2, or a server device having functions of the introducing server 3, the distributing server 7, and the electronic money server 2 may be adopted, for example.

Additionally, although the IC chip of the electronic money card 6 is the non-contact type IC chip, but a contact type IC chip that establishes a communication circuit by using a contact point with respect to an electrode may be utilized.

The foregoing embodiment can obtain the following effects.

(1) The commission object person who receives a commission based on leading a user to the affiliated store site can be set to a third party. Therefore, the commission can be extensively returned to relevant parties who contribute to a customer sending effect.

(2) When the manufacturer of the user terminal 4 is determined as a commission object person, a commission is also continuously paid to the manufacturer every time the user utilizes the user terminal 4 to do his/her shopping at the affiliated store site.

(3) A plurality of commission object persons can be set, and a distribution ratio can be set with respect to them.

(4) When the user is also determined as a commission object person, sales of the user terminal 4 having the built-in reader/writer 5 can be promoted.

(5) The number of users who utilize the electronic money card 6 can be increased, and the distribution of the electronic money can be promoted.

The invention claimed is:

1. A non-transitory computer-readable storage medium storing a computer program, which when executed by a processor, causes a customer terminal to perform operations, comprising:
   detecting, by the customer terminal, that an IC chip is connected to a reader/writer;
   receiving, by the customer terminal, an electronic money function unit ID from the IC chip by transmitting an ID reference command from the customer terminal to the IC chip upon detection of the IC chip;
   storing, by the customer terminal, commission object person information that includes in part, the electronic money function unit ID received from the IC chip;
   responsive to the detection of the IC chip, activating over a network, a browser executed on the customer terminal to display a web page with a Universal Resource Locator (URL) displaying a list of affiliated store sites;
   transmitting, by the customer terminal, the commission object person information stored in the customer terminal, to an introducing server over the network;
   responsive to a store site selection, by a user of the customer terminal, from the list of affiliated store sites presented on the customer terminal, displaying by the customer terminal, a web page associated with the store site selection;
   performing, by the user of the customer terminal, a business transaction to purchase a commodity associated with the store site selection via a store server affiliated with the store site selection;
   responsive to a notification of at least one commission earned received by the user from an electronic money server, the commission being based at least in part on the purchase of the commodity, transmitting, by the customer terminal, the electronic money function unit ID received from the IC chip to the electronic money server, in response to the IC chip being communicatively coupled to the reader/writer; and
   receiving, by the customer terminal to the IC chip, an amount of the commission earned including the at least one commission earned from the electronic money server based on the electronic money function unit ID.

2. The non-transitory computer-readable storage medium of claim 1, wherein the commission object person information is included in connection information in an event of connecting to the introducing server over the network.

3. The non-transitory computer-readable storage medium of claim 1, further comprising a determined program is installed in the IC chip, and the computer program causes the customer terminal to detect the IC chip having the determined program installed therein.

4. The non-transitory computer-readable storage medium of claim 1, wherein the computer program causes the customer terminal to store a monetary value, increase/ decrease the stored monetary value in the IC chip, and perform account settlement in the web page associated with the store site selection.

5. The non-transitory computer-readable storage medium of claim 1, wherein the computer program causes the customer terminal to acquire IC chip information that specifies the IC chip from the IC chip that has been detected, and transmit the acquired IC chip information to the introducing server over the network.

6. An information processing device, comprising:
   a storage device;
   a reader/writer configured to access an IC chip; and
   a processor configured to:
      detect that the IC chip is connected to the reader/writer;
      receive an electronic money function unit ID from the IC chip by transmitting an ID reference command to the IC chip upon detection of the IC chip;
      store, in the storage device, commission object person information that includes in part, the electronic money function unit ID received from the IC chip;
      responsive to the detection of the IC chip, activate over a network a browser executed on the information processing device to display a web page with a Universal Resource Locator (URL) displaying a list of affiliated store sites;
      transmit the commission object person information, stored in the storage device, to an introducing server over the network;
      responsive to a store site selection, by a user of the information processing device, from the list of affiliated store sites presented on the information processing device, display a web page associated with the store site selection;
      perform, by the user of the information processing device, a business transaction to purchase a commodity associated with the store site selection via a store server affiliated with the store site selection;
      responsive to a notification of at least one commission earned received by the user from an electronic money server, the commission being based at least in part on the purchase of the commodity, transmit the electronic money function unit ID received from the IC chip to the electronic money server, in response to the IC chip being communicatively coupled to the reader/writer; and
      receive an amount of the commission earned including the at least one commission earned from the electronic money server based on the electronic money function unit ID.

7. The non-transitory computer-readable storage medium of claim 1, wherein the commission object person information stored in the customer terminal specifies a manufacturer of the customer terminal as the commission object person who receives the commission.

8. The non-transitory computer-readable storage medium of claim 1, wherein the commission object person information is detected by the customer terminal.

9. The non-transitory computer-readable storage medium of claim 1, wherein the computer program further causes the customer terminal to determine a commission amount associated with a commission object person.

10. The non-transitory computer-readable storage medium of claim 9, wherein the customer terminal is associated with the commission object person and the commission amount is based on past results of leading the customer to the web page associated with the store site selection, through the introducing server, on the customer terminal associated with the commission object person.

* * * * *